US008782217B1

(12) United States Patent
Arone et al.

(10) Patent No.: US 8,782,217 B1
(45) Date of Patent: Jul. 15, 2014

(54) ONLINE IDENTITY MANAGEMENT (75) Inventors: Geoffrey V. Arone, Newport Coast, CA (US); Michael P. Clark, Littleton, CO (US); Adam T. Thompson, Denver, CO (US)

(73) Assignee: Safetyweb, Inc., Costa Mesa, CA (US)

(*) Notice: Subject to any disclaimer, the term of this patent is extended or adjusted under 35 U.S.C. 154(b) by 126 days.

(21) Appl. No.: 13/293,014

(22) Filed: Nov. 9, 2011

Related U.S. Application Data (60) Provisional application No. 61/411,957, filed on Nov. 10, 2010.

(51) Int. Cl.
*G06F 15/173* (2006.01)

(52) U.S. Cl.
USPC .............................. 709/224; 726/22; 726/23

(58) Field of Classification Search
USPC ........................ 709/224; 726/22, 23
See application file for complete search history.

(56) References Cited

U.S. PATENT DOCUMENTS

| | | |
|---|---|---|
| 5,590,038 A | 12/1996 | Pitroda |
| 5,640,577 A | 6/1997 | Scharmer |
| 5,659,731 A | 8/1997 | Gustafson |
| 5,666,528 A | 9/1997 | Thai |
| 5,774,692 A | 6/1998 | Boyer et al. |
| 5,797,136 A | 8/1998 | Boyer et al. |
| 5,812,840 A | 9/1998 | Shwartz |
| 5,822,750 A | 10/1998 | Jou et al. |
| 5,825,884 A | 10/1998 | Zdepski et al. |
| 5,844,218 A | 12/1998 | Kawan et al. |
| 5,956,693 A | 9/1999 | Geerlings |
| 5,963,932 A | 10/1999 | Jakobsson et al. |
| 5,990,038 A | 11/1999 | Suga et al. |
| 6,038,551 A | 3/2000 | Barlow et al. |
| 6,073,140 A | 6/2000 | Morgan et al. |
| 6,144,957 A | 11/2000 | Cohen et al. |
| 6,223,171 B1 | 4/2001 | Chaudhuri et al. |
| 6,254,000 B1 | 7/2001 | Degen et al. |
| 6,304,869 B1 | 10/2001 | Moore et al. |
| 6,339,769 B1 | 1/2002 | Cochrane et al. |
| 6,366,903 B1 | 4/2002 | Agrawal et al. |
| 6,457,012 B1 | 9/2002 | Jatkowski |
| 6,496,819 B1 | 12/2002 | Bello et al. |
| 6,523,041 B1 | 2/2003 | Morgan et al. |
| 6,574,623 B1 | 6/2003 | Leung et al. |
| 6,804,346 B1 | 10/2004 | Mewhinney |
| 6,850,895 B2 | 2/2005 | Brodersen et al. |

(Continued)

FOREIGN PATENT DOCUMENTS

WO WO 01/84281 11/2001

OTHER PUBLICATIONS

U.S. Appl. No. 12/705,489, filed Feb. 12, 2010, Bargoli et al.
U.S. Appl. No. 12/705,511, filed Feb. 12, 2010, Bargoli et al.

(Continued)

*Primary Examiner* — Kyung H Shin
(74) *Attorney, Agent, or Firm* — Knobbe, Martens, Olson & Bear, LLP (57) ABSTRACT

An identity scanner monitors information regarding a target individual on various data sources, such as social networking sites. The information is analyzed to identify risk and/or reward factors that are indicative of risk levels associated with the target's privacy, reputation, safety, health, and/or other attributes. Various information regarding the identified risks and/or reward factors identified may be provided to a monitoring individual (e.g., a guardian of the target individual) in various customizable manners and mediums.

12 Claims, 4 Drawing Sheets

(56) References Cited

U.S. PATENT DOCUMENTS

| | | |
|---|---|---|
| 6,871,287 B1 | 3/2005 | Ellingson |
| 6,910,624 B1 | 6/2005 | Natsuno |
| 6,934,714 B2 | 8/2005 | Meinig |
| 6,985,887 B1 | 1/2006 | Sunstein et al. |
| 7,003,504 B1 | 2/2006 | Angus et al. |
| 7,028,013 B2 | 4/2006 | Saeki |
| 7,028,052 B2 | 4/2006 | Chapman et al. |
| 7,046,139 B2 | 5/2006 | Kuhn et al. |
| 7,050,989 B1 | 5/2006 | Hurt et al. |
| 7,082,435 B1 | 7/2006 | Guzman et al. |
| 7,185,016 B1 | 2/2007 | Rasmussen |
| 7,200,602 B2 | 4/2007 | Jonas |
| 7,209,895 B2 | 4/2007 | Kundtz et al. |
| 7,234,156 B2 | 6/2007 | French et al. |
| 7,246,740 B2 | 7/2007 | Swift et al. |
| 7,249,048 B1 | 7/2007 | O'Flaherty |
| 7,272,591 B1 | 9/2007 | Ghazal et al. |
| 7,277,900 B1 | 10/2007 | Ganesh et al. |
| 7,314,167 B1 | 1/2008 | Kiliccote |
| 7,343,149 B2 | 3/2008 | Benco |
| 7,370,044 B2 | 5/2008 | Mulhern et al. |
| 7,373,335 B2 | 5/2008 | Cleghorn et al. |
| 7,389,913 B2 | 6/2008 | Starrs |
| 7,403,942 B1 | 7/2008 | Bayliss |
| 7,421,442 B2 | 9/2008 | Gelb et al. |
| 7,424,439 B1 | 9/2008 | Fayyad et al. |
| 7,433,864 B2 | 10/2008 | Malik |
| 7,451,113 B1 | 11/2008 | Kasower |
| 7,458,508 B1 | 12/2008 | Shao et al. |
| 7,467,127 B1 | 12/2008 | Baccash et al. |
| 7,503,489 B2 | 3/2009 | Heffez |
| 7,509,117 B2 | 3/2009 | Yum |
| 7,512,221 B2 | 3/2009 | Toms |
| 7,529,698 B2 | 5/2009 | Joao |
| 7,542,993 B2 | 6/2009 | Satterfield et al. |
| 7,548,886 B2 | 6/2009 | Kirkland et al. |
| 7,562,093 B2 | 7/2009 | Gelb et al. |
| 7,562,184 B2 | 7/2009 | Henmi et al. |
| 7,575,157 B2 | 8/2009 | Barnhardt et al. |
| 7,581,112 B2 | 8/2009 | Brown et al. |
| 7,593,889 B2 | 9/2009 | Raines et al. |
| 7,594,019 B2 | 9/2009 | Clapper |
| 7,610,216 B1 | 10/2009 | May et al. |
| 7,620,596 B2 | 11/2009 | Knudson et al. |
| 7,623,844 B2 | 11/2009 | Herrmann et al. |
| 7,653,600 B2 | 1/2010 | Gustin |
| 7,672,833 B2 | 3/2010 | Blume et al. |
| 7,672,924 B1 | 3/2010 | Scheurich et al. |
| 7,672,926 B2 | 3/2010 | Ghazal et al. |
| 7,686,214 B1 | 3/2010 | Shao et al. |
| 7,689,487 B1 | 3/2010 | Britto et al. |
| 7,689,505 B2 | 3/2010 | Kasower |
| 7,690,032 B1 | 3/2010 | Peirce |
| 7,707,122 B2 | 4/2010 | Hull et al. |
| 7,708,190 B2 | 5/2010 | Brandt et al. |
| 7,711,635 B2 | 5/2010 | Steele et al. |
| 7,739,707 B2 | 6/2010 | Sie et al. |
| 7,747,559 B2 | 6/2010 | Leitner et al. |
| 7,761,384 B2 | 7/2010 | Madhogarhia |
| 7,769,697 B2 | 8/2010 | Fieschi et al. |
| 7,787,869 B2 | 8/2010 | Rice et al. |
| 7,792,903 B2 | 9/2010 | Fischer et al. |
| 7,793,835 B1 | 9/2010 | Coggeshall et al. |
| 7,802,104 B2 | 9/2010 | Dickinson |
| 7,809,797 B2 | 10/2010 | Cooley et al. |
| 7,827,115 B2 | 11/2010 | Weller et al. |
| 7,841,004 B1 | 11/2010 | Balducci et al. |
| 7,844,604 B2 | 11/2010 | Baio et al. |
| 7,849,014 B2 | 12/2010 | Erikson |
| 7,853,493 B2 | 12/2010 | DeBie et al. |
| 7,975,299 B1 * | 7/2011 | Balducci et al. ................ 726/22 |
| 7,983,932 B2 | 7/2011 | Kane |
| 2002/0010664 A1 | 1/2002 | Rabideau et al. |
| 2002/0013899 A1 | 1/2002 | Faul |
| 2002/0052884 A1 | 5/2002 | Farber et al. |
| 2002/0069122 A1 | 6/2002 | Yun et al. |
| 2002/0077964 A1 | 6/2002 | Brody et al. |
| 2002/0087460 A1 | 7/2002 | Hornung |
| 2002/0128962 A1 | 9/2002 | Kasower |
| 2002/0133462 A1 | 9/2002 | Shteyn |
| 2002/0169747 A1 | 11/2002 | Chapman et al. |
| 2002/0173994 A1 | 11/2002 | Ferguson, III |
| 2003/0009418 A1 | 1/2003 | Green et al. |
| 2003/0009426 A1 | 1/2003 | Ruiz-Sanchez |
| 2003/0018549 A1 | 1/2003 | Fei et al. |
| 2003/0061163 A1 | 3/2003 | Durfield |
| 2003/0097380 A1 | 5/2003 | Mulhern et al. |
| 2003/0115133 A1 | 6/2003 | Bian |
| 2003/0171942 A1 | 9/2003 | Gaito |
| 2003/0195859 A1 | 10/2003 | Lawrence |
| 2003/0212654 A1 | 11/2003 | Harper et al. |
| 2004/0044628 A1 | 3/2004 | Mathew et al. |
| 2004/0153448 A1 | 8/2004 | Cheng et al. |
| 2004/0167793 A1 | 8/2004 | Masuoka et al. |
| 2004/0193891 A1 | 9/2004 | Ollila |
| 2004/0220896 A1 | 11/2004 | Finlay et al. |
| 2004/0230527 A1 | 11/2004 | Hansen et al. |
| 2004/0230534 A1 | 11/2004 | McGough |
| 2005/0021476 A1 | 1/2005 | Candella et al. |
| 2005/0027983 A1 | 2/2005 | Klawon |
| 2005/0058262 A1 | 3/2005 | Timmins et al. |
| 2005/0137899 A1 | 6/2005 | Davies et al. |
| 2005/0154665 A1 | 7/2005 | Kerr |
| 2005/0187948 A1 | 8/2005 | Monitzer et al. |
| 2006/0041464 A1 | 2/2006 | Powers et al. |
| 2006/0059110 A1 | 3/2006 | Madhok et al. |
| 2006/0074986 A1 | 4/2006 | Mallalieu et al. |
| 2006/0074991 A1 | 4/2006 | Lussier et al. |
| 2006/0080263 A1 | 4/2006 | Willis et al. |
| 2006/0129481 A1 | 6/2006 | Bhatt et al. |
| 2006/0131390 A1 | 6/2006 | Kim |
| 2006/0161435 A1 | 7/2006 | Atef et al. |
| 2006/0173776 A1 | 8/2006 | Shalley et al. |
| 2006/0178971 A1 | 8/2006 | Owen et al. |
| 2006/0184585 A1 | 8/2006 | Grear et al. |
| 2006/0229943 A1 | 10/2006 | Mathias et al. |
| 2006/0229961 A1 | 10/2006 | Lyftogt et al. |
| 2006/0239512 A1 | 10/2006 | Petrillo |
| 2006/0253358 A1 | 11/2006 | Delgrosso et al. |
| 2006/0262929 A1 | 11/2006 | Vatanen et al. |
| 2006/0271456 A1 | 11/2006 | Romain et al. |
| 2006/0271457 A1 | 11/2006 | Romain et al. |
| 2007/0005508 A1 | 1/2007 | Chiang |
| 2007/0027816 A1 | 2/2007 | Writer |
| 2007/0067297 A1 | 3/2007 | Kublickis |
| 2007/0072190 A1 | 3/2007 | Aggarwal |
| 2007/0073889 A1 | 3/2007 | Morris |
| 2007/0078985 A1 | 4/2007 | Shao et al. |
| 2007/0083460 A1 | 4/2007 | Bachenheimer |
| 2007/0093234 A1 | 4/2007 | Willis et al. |
| 2007/0112667 A1 | 5/2007 | Rucker |
| 2007/0124256 A1 | 5/2007 | Crooks et al. |
| 2007/0160458 A1 | 7/2007 | Yen |
| 2007/0174186 A1 | 7/2007 | Hokland |
| 2007/0174448 A1 | 7/2007 | Ahuja et al. |
| 2007/0205266 A1 | 9/2007 | Carr et al. |
| 2007/0244807 A1 | 10/2007 | Andringa et al. |
| 2007/0282730 A1 | 12/2007 | Carpenter et al. |
| 2007/0288355 A1 | 12/2007 | Roland et al. |
| 2008/0010206 A1 | 1/2008 | Coleman |
| 2008/0010687 A1 | 1/2008 | Gonen et al. |
| 2008/0059224 A1 | 3/2008 | Schechter |
| 2008/0066188 A1 | 3/2008 | Kwak |
| 2008/0071682 A1 | 3/2008 | Dominguez |
| 2008/0077526 A1 | 3/2008 | Arumugam |
| 2008/0103800 A1 | 5/2008 | Domenikos et al. |
| 2008/0103972 A1 | 5/2008 | Lanc |
| 2008/0126233 A1 | 5/2008 | Hogan |
| 2008/0175360 A1 | 7/2008 | Schwarz et al. |
| 2008/0183480 A1 | 7/2008 | Carlson et al. |
| 2008/0228775 A1 | 9/2008 | Abhyanker et al. |
| 2008/0255992 A1 | 10/2008 | Lin |
| 2008/0281737 A1 | 11/2008 | Fajardo |
| 2008/0282324 A1 | 11/2008 | Hoal |

(56) References Cited

U.S. PATENT DOCUMENTS

| | | |
|---|---|---|
| 2008/0288283 A1 | 11/2008 | Baldwin, Jr. et al. |
| 2008/0320575 A1 | 12/2008 | Gelb et al. |
| 2009/0006230 A1 | 1/2009 | Lyda et al. |
| 2009/0024505 A1 | 1/2009 | Patel et al. |
| 2009/0037332 A1 | 2/2009 | Cheung et al. |
| 2009/0048877 A1 | 2/2009 | Binns et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0112650 A1 | 4/2009 | Iwane |
| 2009/0125369 A1 | 5/2009 | Kloostra et al. |
| 2009/0126013 A1 | 5/2009 | Atwood et al. |
| 2009/0177529 A1 | 7/2009 | Hadi |
| 2009/0177670 A1 | 7/2009 | Grenier et al. |
| 2009/0183259 A1* | 7/2009 | Rinek et al. ............... 726/23 |
| 2009/0210241 A1 | 8/2009 | Calloway |
| 2009/0217342 A1 | 8/2009 | Nadler |
| 2009/0234665 A1 | 9/2009 | Conkel |
| 2009/0249451 A1 | 10/2009 | Su et al. |
| 2009/0254476 A1 | 10/2009 | Sharma et al. |
| 2009/0254656 A1* | 10/2009 | Vignisson et al. ............ 709/224 |
| 2009/0260064 A1 | 10/2009 | Mcdowell et al. |
| 2009/0307778 A1 | 12/2009 | Mardikar |
| 2009/0327054 A1 | 12/2009 | Yao et al. |
| 2010/0043055 A1 | 2/2010 | Baumgart |
| 2010/0094768 A1 | 4/2010 | Miltonberger |
| 2010/0100945 A1 | 4/2010 | Ozzie et al. |
| 2010/0114744 A1 | 5/2010 | Gonen |
| 2010/0114776 A1 | 5/2010 | Weller et al. |
| 2010/0130172 A1 | 5/2010 | Vendrow et al. |
| 2010/0145840 A1 | 6/2010 | Kasower |
| 2010/0153278 A1 | 6/2010 | Farsedakis |
| 2010/0174813 A1 | 7/2010 | Hildreth et al. |
| 2010/0179906 A1 | 7/2010 | Hawkes |
| 2010/0185546 A1 | 7/2010 | Pollard |
| 2010/0205662 A1 | 8/2010 | Ibrahim et al. |
| 2010/0229245 A1 | 9/2010 | Singhal |
| 2010/0241535 A1 | 9/2010 | Nightengale et al. |
| 2010/0257577 A1 | 10/2010 | Grandison et al. |
| 2010/0280914 A1 | 11/2010 | Carlson |
| 2011/0004498 A1 | 1/2011 | Readshaw |
| 2011/0035788 A1 | 2/2011 | White et al. |
| 2011/0040629 A1 | 2/2011 | Chiu et al. |
| 2011/0113086 A1 | 5/2011 | Long et al. |

OTHER PUBLICATIONS

Chores & Allowances. "Do Kids Have Credit Reports?" http://choresandallowances.blogspot.com/2007/10/do-kids-have-credit-reports.html Oct. 15, 2007 as printed May 31, 2011.

Elmasri et al., "Fundamentals of Database Systems, Third Edition (Excerpts)," pp. 253, 261, 268-270, 278-280, 585, 595, Jun. 2000.

Ettore, Paul Kahn on Exceptional Marketing. Management Review, vol. 38(11), Nov. 1994, pp. 48-51.

Gibbs, Adrienne; "Protecting Your Children from Identity Theft," http://www.creditcards.com/credit-card-news/identity-ID-theft-and-kids-children-1282.php Nov. 25, 2008 as printed Jul. 5, 2011.

ID Theft Assist, "Do You Know Where Your Child's Credit Is?" http://www.idtheftassist.com/pages/story14 Nov. 26, 2007, as printed May 31, 2011.

Ideon, Credit-Card Registry that Bellyflopped this Year, Is Drawing some Bottom-Fishers, The Wall Street Journal, Aug. 21, 1995, pp. C2.

"Intelligent Miner Applications Guide"; Chapters 4-7; pp. 33-132; IBM Corp., Apr. 2, 1999.

Rawe, Julie; "Identity Thieves", Time Bonus Section, Inside Business, Feb. 2002.

Lee, W.A.; "Experian, on Deal Hunt, Nets Identity Theft Insurer", American Banker: The Financial Services Daily, 1pg., New York, NY, Jun. 4, 2003.

LifeLock, "How LifeLock Works," http://www.lifelock.com/lifelock-for-people, accessed Mar. 14, 2008.

LifeLock, "LifeLock Launches First ID Theft Prevention Program for the Protection of Children," Oct. 14, 2005 Press Release, posted on http://www.lifelock.com/about-us/press-room/2005-press-releases/lifelock-protection-for-children, accessed Mar. 14.

LifeLock; "How can LifeLock protect my kids and family?," http//www.lifelock.com/lifelock-for-people/how-we-do-it/how-can-lifelock-protect-my-kids-and-family, accessed Mar. 14, 2008.

Magid, Lawrence, J., Business Tools: When Selecting an ASP Ensure Data Mobility, Los Angeles Times, Feb. 26, 2001, vol. C, Issue 4, pp. 3 pages, Los Angeles, CA.

Privacy Rights Clearinghouse: Identity Theft—"What to do if it happens to you" (www.privacyrights.org) (1999).

Ramaswamy, Vinita M., Identity-Theft Toolkit, The CPA Journal, Oct. 1, 2006, vol. 76, Issue 10, pp. 66 (5 pages).

Truston, "Checking if your child is an ID theft victim can be stressful," as posted by Michelle Pastor on Jan. 22, 2007 at http://www.mytruston.com/blog/credit/checking_if_your_child_is_an_id_theft_vi.html.

Vamosi, Robert, "How to Handle ID Fraud's Youngest Victims," http://news.cnet.com/8301-1.0789_3-10105303-57.html Nov. 21, 2008 as printed May 31, 2011.

Various Posts from the <p2p.wrox.com> Forums: http://web.archive.org/web/2005045221950/http://p2p.wrox.com/topic.asp?TOPIC_ID=6513, dated Nov. 15, 2003-Oct. 7, 2004.

Waggoner, Darren J, Global Identity Crisis, Collections Credit Risk, Aug. 2001, vol. vol. 6, Issue No. 8.

Web Page posted at: http://web.archive.org/web20040805124909/http://www.oracle.com/technology/sample_codete/tech/pl_sql/htdocs/x/Case/start.htm, pp. 1 and 4 of the webpage posted on Jan. 7, 2003.

\* cited by examiner

ONLINE IDENTITY MANAGEMENT

CROSS-REFERENCE TO RELATED APPLICATIONS

This application claims the benefit of U.S. provisional application No. 61/411,957, filed Nov. 10, 2010 the disclosure of which is hereby incorporated by reference in its entirety.

BACKGROUND

It is increasingly common for people, especially younger individuals including children, to have one or more online profiles. However, many parents do not know if their child's profile is visible to all and have set no rules for their children's use of social networks. As usage of this medium has exploded and adoption has accelerated, the risks for misuse have also grown. One need only read the latest headlines to see the impact that social media has had on children who have been exposed to cyberbullying, predators, pedophiles, identity thieves, and other dangerous individuals. These risks and activities are exacerbated by the fact that teens are increasingly using these online services from their mobile phones, which makes it more difficult for parents to protect their children from devastating consequences. This combination of mobility, lack of privacy, and viral messaging has made risks to children and their safety and reputation greater than ever.

SUMMARY

Described herein are systems and methods for enabling parents to monitor online activities across multiple sites and multiple platforms, as well as monitor activities of other children that may involve their children, such that they can protect them from inappropriate content that can be intercepted in real time, for example.

In one embodiment, a method of providing information to a guardian of a minor regarding activities of a minor comprises receiving information from a guardian of a minor indicating one or more delivery mediums for receiving information regarding activities of the minor, receiving information from the guardian identifying one or more events of interest to the guardian, scanning a plurality of online data sources including at least one social network for information regarding the minor, wherein information regarding the minor includes information provided by the minor and information provided by one or more third-parties that refers to the minor, parsing text portions of the information to identify text matching one or more keywords or patterns indicative of one or more of the identified events, scanning image portions of the information to identify objects matching one or more objects indicative of one or more of the identified events, and determining a risk score for the minor based on at least a quantity of identified text and identified objects.

In one embodiment, a method of providing real-time information regarding activities of an individual comprises receiving, from a computing device of a monitoring entity, at least a name of a target individual for which information is desired, periodically accessing or receiving information from one or more social media networks for information regarding the target individual, analyzing the information regarding the target individual to determine whether any of the information is indicative of a high risk activity, and in response to determining that one or more high risk activities are in the information, initiating transmission of a real-time alert to a computing device of the monitoring entity.

In one embodiment, a system for monitoring online activate impacting a user comprises a discovery engine configured to discover one or more networks in which the user is involved or mentioned, a data extraction engine configured to extract data from the networks discovered by the discovery engine, an analytics engine configured to interpret the data extracted by the data extraction engine to identify information that may help or hurt the user's privacy, reputation or safety, and a reporting engine configured to capture the data generated by the analytics engine and presenting it in a single unified view.

DETAILED DESCRIPTION OF EXAMPLE EMBODIMENTS

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Although the description provided herein refers to individuals, consumers, or customers, the terms "user," "individual," "consumer," and "customer" should be interpreted to include groups of individuals, such as, for example, married couples or domestic partners, organizations, groups, and business entities.

Figure 1:
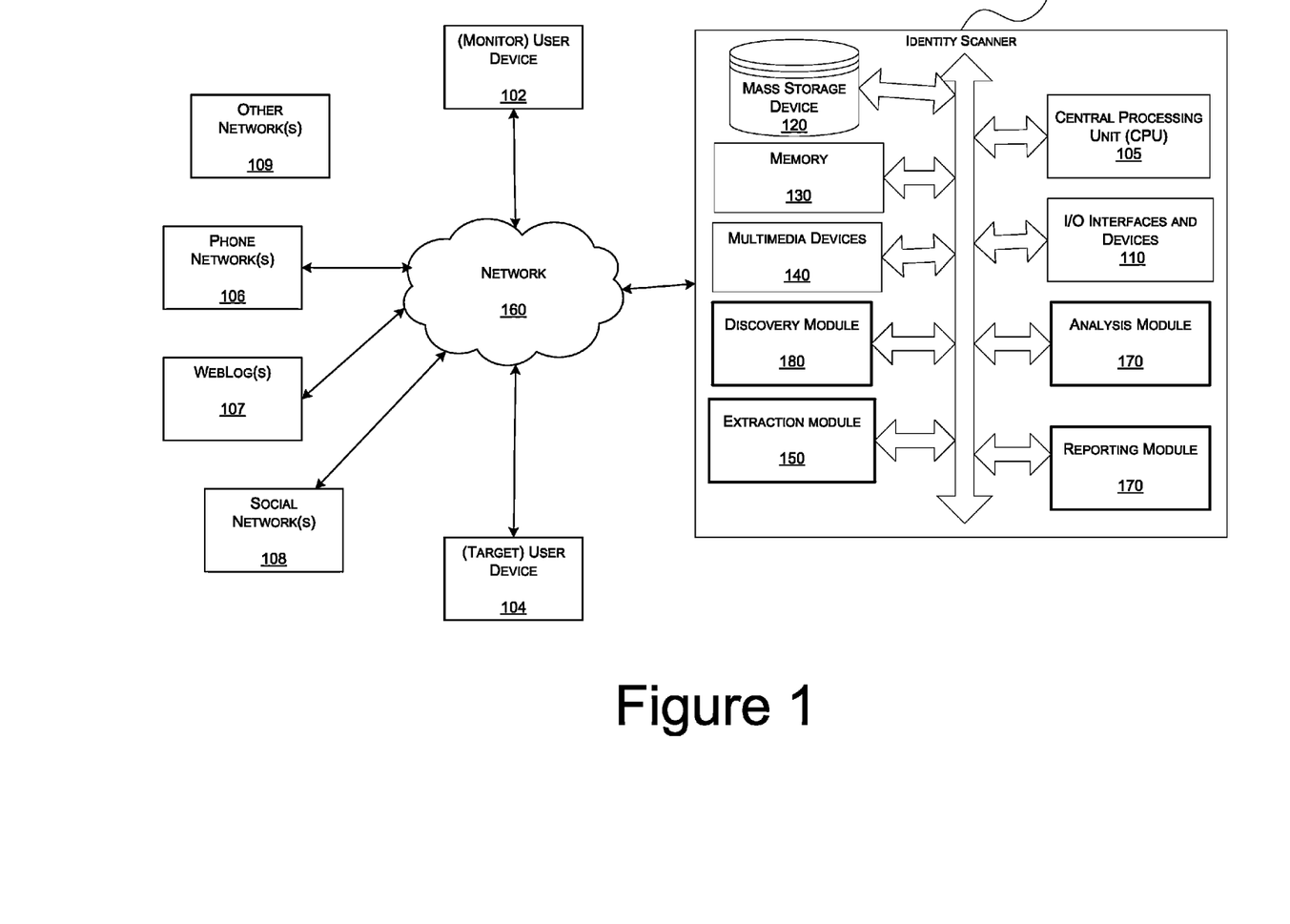
FIG. 1 is a block diagram illustrating an identity scanner in communication with multiple data sources.

FIG. 1 is a block diagram of an identity scanner 100 in communication with multiple data sources. In this embodiment, a monitor user device 102 is in communication with the identity scanner 100, which is configured to scan various data resources to identify information regarding a target, such as a minor. A monitoring entity, such as a parent, guardian, organization, or other person that is responsible for a target individual (or simply "target"), such as a child or other minor, operates the monitor user device 102 that is configured to receive monitor information from the identity scanner 100. In this embodiment, the identity scanner 100 scans one or more of the data sources 106-109 for information regarding activities of the target. The information scanned on the various data sources may include information provided by the target (e.g., posts from the target on a social networking site) and/or information provided by third parties that relates to the target (e.g. photos uploaded by a party host that include images/information associated with the target or information provided by friends of the target). Thus, the identity scanner 100 can access many different sources of information, identify information indicative of risks to the target (or, in some embodiments, can identify positive activities of the target), and alert the monitoring entity to the identified activities, possibly preventing harm or other adverse actions towards the target.

The example configuration of FIG. 1 includes one or more phone networks 106, one or more weblogs (or simply "blogs") 107, one or more social networks 108, and one or more other networks 109. Each network includes one or more data sources, such as publicly available data (e.g., publicly available social networking information), privately accessible data (e.g., private data on a blog) accessible through browsers, ftp software, specialized APIs, and/or other means. Thus, some data sources may be accessed by the identity scanner 100 without receiving credentials from the monitoring entity (for a blog associated with the target), while others may require that the monitoring entity provide credentials (e.g., login and password) to allowed the identity scanner 100 to access. In other embodiments, any number of data sources may be accessed and scanned in order to identify information associated with the target.

Social networks 108 are web services and/or websites that are configured to permit users to post or otherwise transmit information (e.g., about themselves) and publish and share information on a one-to-many basis in real-time (or near real-time). A few current examples of social networks include Facebook™ Twitter™, Friendster™, Yelp™, Myspace™, LinkedIn™, and ShutteryFly™. Information submitted to social networks may be in text, images, audio files, video files or any number of other multimedia files that may relate or otherwise be shared by the user.

Phone networks 106 include information regarding phone traffic, such as phone calls, SMS (short messaging service), MMS (multimedia messaging service), files (e.g., apps) downloaded on mobile phones, data transmitted or received from mobile phones, usage information such as number of calls made, phone numbers called, time of day, number of text messages sent, amount of data transmitted, features that are enabled on the phone, phone make/model information, and/or any other data related to phones. Phone data may also include geolocation data from mobile phones, such as from the target user device 104 and/or devices of friends/family/affiliates of the target. Phone data may be provided by mobile services providers.

Weblog networks 107 include data from weblogs (or "blogs"). Often data on blogs is publicly available, but some blogs require authentication (similar to authentication that may be required to access social networks or phone networks).

Other networks 109 may include any other types of data sources. For example, location data may be received from location-based services such as Foursquare™ and Gowalla™, or could also be extracted from other sources such as posted digital pictures (cameras often stamp location data on pictures), phone network 106 data (e.g., call origination information), location information set forth in one or more posts on social networks 108 (e.g., "I am in Los Angeles") or any number of other means for establishing the location of the target at a given day/time.

In one embodiment, the monitor (e.g., the guardian of the target child), provides preferences for scanning the data sources for information regarding the target and/or rules for reporting locate information. In one embodiment, the identity scanner 100 scans at least some of the data sources frequently (e.g., constantly or periodically) in order to obtain information regarding the target that can be reported to the monitor and 80 real-time manner.

Example System Configuration

In the embodiment of FIG. 1, the network 160 may include any combination of communication networks, such as one or more of the Internet, LANs, WANs, MANs, etc., for example. In the embodiment of FIG. 1, the identity scanner 100 includes a computing system having one or more computing devices (e.g., computers). The computing system may include, for example, a single computing device, a computer server, or a combination of one or more computing devices and/or computer servers. Depending on the embodiment, the components illustrated in the identity scanner 100 may be distributed amongst multiple devices, such as via a local area or other network connection. In other embodiments the identity scanner 100 may include fewer and/or additional components that are illustrated in FIG. 1.

The exemplary identity scanner 100 includes one or more central processing units ("CPU") 105, which may each include one or more conventional or proprietary microprocessor(s). The identity scanner 100 may further include one or more memories 130, such as random access memory ("RAM"), for temporary storage of information, a read only memory ("ROM") for permanent storage of information, and/or a mass storage device 120, such as a hard drive, diskette, or optical media storage device. The memory 130 may store software code, or instructions, for execution by the processor 105 in order to cause the computing device (e.g., the identity scanner 100) to perform certain operations, such as determining collection actions for respective consumers.

The methods described and claimed herein may be performed by any suitable computing device, such as the identity scanner 100, or possibly the monitor user device 102, or the target user device 104. The methods may be executed on the computing devices in response to execution of software instructions or other executable code read from a tangible computer readable medium. A computer readable medium is a data storage device that can store data, which can thereafter be read by a computer system. Examples of a computer readable media include read-only memory, random-access memory, CD-ROMs, magnetic tape, flash drives, and optical data storage devices.

The identity scanner 100 is generally controlled and coordinated by operating system software, such as Windows 95, Windows 98, Windows NT, Windows 2000, Windows XP, Windows Vista, Windows 7, Windows Server, Windows Mobile, Unix, Linux (including any of the various variants thereof), SunOS, Solaris, mobile phone operating systems, or other operating systems. In Macintosh systems, the operating system may be any available operating system, such as MAC OS X or iPhone OS. In other embodiments, the identity scanner 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary identity scanner 100 may include one or more input/output (I/O) devices and interfaces 110, such as a keyboard, trackball, mouse, drawing tablet, joystick, game controller, touchscreen (e.g., capacitive or resistive touchscreen) touchpad, accelerometer, and/or printer, for example. The computing device may also include one or more multimedia devices 140, such as a display device (also referred to herein as a display screen), which may also be one of the I/O devices 110 in the case of a touchscreen, for example. Display devices may include LCD, OLED, or other thin screen display surfaces, a monitor, television, projector, or any other device that visually depicts user interfaces and data to viewers. The identity scanner 100 may also include one or more multimedia devices, such as speakers, video cards, graphics accelerators, and/or microphones, for example.

In the embodiment of FIG. 1, the I/O devices and interfaces 110 provide a communication interface to various external devices via the network 160. For example, the identity scanner 100 may be electronically coupled to the network 160 via a wired, wireless, or combination of wired and wireless, communication link(s). The network 160 may allow communication with various other computing devices and/or other electronic devices via wired or wireless communication links.

In the embodiment of FIG. 1, the identity scanner 100 includes a discovery module 180, an extraction module 150, an analysis module 170, and a reporting module 170, which are each described in further detail below. The term "module," as used herein, refers to any combination of software, firmware, and hardware. For example, certain modules comprise only software code that may be executed by a computer processor, such as the CPU 105. Modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Hardware modules may include connected logic units, such as gates and flip-flops, and/or may be comprised of programmable units, such as programmable gate arrays or processors. Generally, the modules described herein refer to logical modules that may be combined with other modules or divided into sub-modules despite their physical organization or storage.

Example Modules

In the embodiment of FIG. 1, the identity scanner 100 includes four modules: a discovery module 180, an extraction module 150, an analysis module 170, and a reporting module 170. In this embodiment, each of the modules is shown as part of the identity scanner 100. However, in other embodiments, the modules may be distributed across multiple devices, and may be controlled and/or operated by multiple different entities. In other embodiment, the identity scanner 100 may include fewer and/or different modules than are illustrated in FIG. 1.

In one embodiment, the identity scanner 100 is configured to receive information from a monitoring entity (e.g., guardian of a minor) requesting monitoring of activities of a target (e.g. a minor). For example, the request may be received via a web interface, by phone, in person, or in any other manner. In some embodiments, the monitoring entity must have a relationship with the target that justifies monitoring. For example, the monitoring entity may be required to be a parent or guardian of the target, and the identity scanner 100 may require authentication information that satisfactorily proves that the monitoring entity truly is the guardian or parent of the target.

In one embodiment, the monitoring entity provides one or more identifiers that are connected with that target ("Target Identifiers"). Target Identifiers may include, for example, the name, address, cell phone number, online identities, email address, handles/nicknames, friends, and the like. The monitoring entity may also provide one or more preferences or settings, such as the frequency and/or urgency of notifications, mobile alerts, and other settings that can impact when a user receives a report, as well as a format (e.g., SMS, MMS, email, web pages, mobile apps, etc.) for receiving alerts and/or other reports from the identity scanner 100. Depending on the embodiment, the monitoring entity may establish rules that indicate any combination of delivery mediums and delivery timing (e.g., urgent, daily, weekly, etc.) for activities matching particular criteria. For example, the monitoring entity may indicate that urgent alerts are transmitted via SMS messages to a mobile device of the monitoring entity (e.g., a cell phone of a guardian) in response to detection of a high risk event (also referred to as high risk "activities") of the monitored individual, while also indicating that lower risk events, such as activities related to use of profanity, are only provided in a weekly report provided via email to an email address of the monitoring entity. In other embodiments, any other user rules may be established for reporting of various data related to the target individual.

The discovery module 180 is configured to identify one or more data sources, such as the data sources 106-109 of FIG. 1, to scan, monitor and/or receive information from, in order to potentially identify information regarding the target. In one embodiment, one or more of the data sources may be supplied by the monitoring entity, such as via a web interface that allows selection of social networking sites and possibly authentication information that is usable to access private information of the target on the social networking sites. In some embodiments, the discovery module 180 scans a plurality of data sources to determine which sources may have information regarding the target, without the monitoring entity providing information regarding the plurality of data sources. For example, the discovery module 180 may scan various (hundreds, thousands, or more) data sources (e.g., the data sources 106-109) using various portions of the target identifiers for any accounts that may be linked to (or otherwise associated with) the target. In one embodiment, the discovery module 180 can optionally present one or more potential "hits" to the monitoring entity for confirmation. For example, if Cindy Smith is the name of the target and the discovery module 180 discovers thirty-three different "Cindy Smith" profiles on various social networks, the discovery module 180 may present a short summary of each possible matching account and ask the monitoring entity to select which account, or accounts, are associated with the target. Once one or more accounts have been discovered, the discovery module 180 accesses and/or retrieves data that can be extracted from the various data sources that are indicated as associated with the target (e.g., by manual input from the monitoring entity and/or by automatic scanning of data sources by the identity scanner). In one embodiment, the identity scanner 100 has access to application programming interfaces (APIs) that may be used by various data sources so that data may be more easily accessed from the respective data sources.

The extraction module 150 receives information located by the discovery module and extracts meaningful data from the raw data. In other embodiments, the extraction module 150 also periodically accesses data from one or more of the data sources. The extraction module 150 is configured to remove the noise and convert useful data into a form and format that can be stored for further analysis. For example, the extraction module may be configured to determine that there is an abundance of contextual information that often gets jumbled with relevant information when making complex queries and reduce the impact of such data by the analysis module 170 (or entirely remove such "noise" data).

In one embodiment, the extraction module 150 establishes and monitors one or more activity feeds 215 to monitor and extract data realtime data from various data sources. For example, APIs for the various data sources may be used to received realtime information from respective data source. In one embodiment, activity feeds may include automated instruction to retrieve and store data generated by the target on one or more monitored data sources. Activity feeds could include status updates, posted pictures, videos, comments, phone called, geolocation-based check-ins, or any number of other forms of electronic content. Activity feeds may include any content posted by the user being monitored and may also include information that is posted about the user by a third party. For example, certain social media sites enables photo "tagging" on their service. An activity feed may be to retrieve picture that tag the target and perform analysis of the picture as discussed below.

The analysis module 170 accesses the extracted data and applies one or more rules and/or algorithms to identify data of interest in the data. In one embodiment, the analysis module 170 applies rules to identify "factors" that are usable to generate one or more risk scores for target. In one embodiment, rules are configured to represent respective events associated with the target. For example, a first rule may have criteria configured to detect alcohol use and a second rule may have criteria configured to detect a high risk of physical danger to the target. Such rules may include analysis of natural language processing and/or image processing algorithms in order to identity such factors, which may include positive factors (e.g., reward factors) and/or negative factors (e.g., risk factors). Factors may be weighted to indicate a severity, strength, or importance of a particular factor. For example, factors may be associated with a weighing, such as 1-100, on 1-10, A-F, or any other scale. Similarly, factors may be weighted into low risk, medium risk, and high risk factors, for example. Identification and weighing of factors may be based rules for identifying various factors. For example, the analysis module 170 may identify a risk factor for a target in response to receiving an image that was taken at a party and using an image processing algorithm to identify the presence of one or more risk items, such as a beer bottle, nudity, weapons, drug paraphernalia, in the image. Depending on the embodiment, presence of multiple objects related to a negative factor (e.g., risk factor) even and/or the same objects in multiple images, may result in recording of multiple negative factors and/or or change of the weighting of the factor to indicate an increased risk (e.g., a negative factor may be changed from a low risk factor to a high risk factor in response to identifying risk items in photos from multiple friends of the target within a short time period.)

Similarly, the analysis module 170 may employ one or more natural language processing algorithms to "read" data (e.g., posts or links of the target or referring to the target) and map them back to one or more "topics" that may each be associated with negative or positive factor. For example, topics may be parties that the target wants to attend, events that the target commented on, slang drug terms, profanity, discussion of family members, or any number of other suggestive or provocative information that can be interpreted associated as a risk item. Similarly, the analysis module 170 could be employed to identify positive factors, such as in response to identifying pictures from family events, sharing links to reliable news stories or educational sites, or otherwise engaging in conversations that appear to have a positive influence and reflect well on the target. Factors associated with natural language processing may be weighted in a similar manner to those discussed above with reference to image processing.

In one embodiment, the analysis module 170 analyses the factors that have been identified in the extracted data, and uses the factors to generate one or more risk scores that may be provided to the monitoring entity in various manners. Additionally, the underlying data, e.g., photographs, text, phone calls, etc., that triggered the factor may also be provided to the monitoring entity in various manners. In one embodiment, a scoring report provides a summary of the located negative and positive factors, and/or provides details of the data that was analyzed to trigger each factor. For example, a report may be provided to the monitoring entity that includes a list of risks and rewards associated with the target with links to stored data (e.g., from the data sources) that can be view, as desired by the monitoring entity. In one embodiment, only certain types of factors may be reported to the monitoring entity, such as based on system defaults and/or preferences of the monitoring entity. For example, low risk factors may not be individually reported to the monitoring entity, but may still be used in determining one or more risk scores for the target.

Example Methods

Depending on the embodiment, the methods described with reference to the flowchart of FIG. 2, as well as any other methods discussed herein, may include fewer or additional blocks and/or the blocks may be performed in a different order than is illustrated. Software code configured for execution on a computing device in order to perform the methods may be provided on a computer readable medium, such as a compact disc, digital video disc, flash drive, hard drive, memory device or any other tangible medium. Such software code may be stored, partially or fully, on a memory of a computing device, such as the identity scanner 100, and/or other computing devices illustrated in the Figures, in order to perform the respective methods. For ease of explanation, the method will be described herein as performed by the identity scanner 100, which should be interpreted to include any one or more of the computing devices noted above and/or any other suitable computing device.

Figure 2:
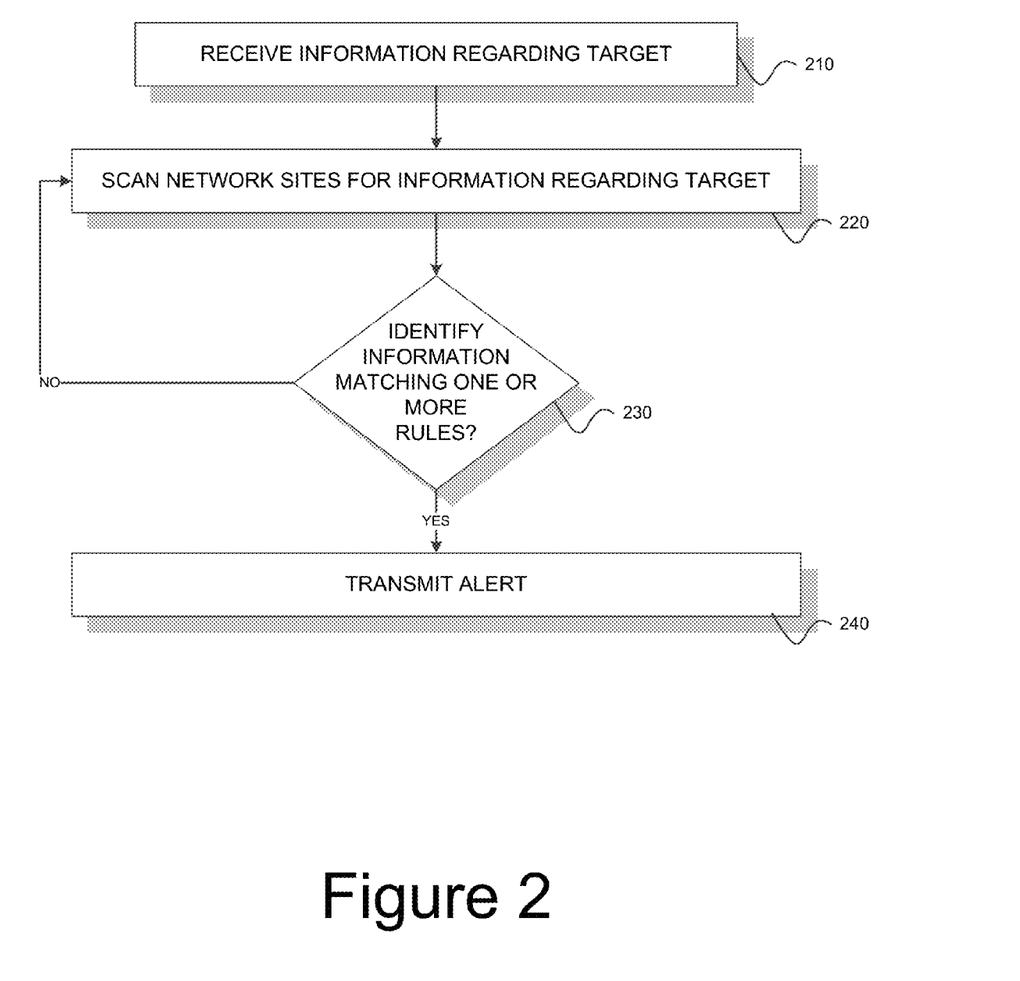
FIG. 2 is a flowchart illustrating one embodiment of a method for accessing data from one or more data sources and determining when alerts should be provided.

FIG. 2 is a flowchart illustrating one embodiment of a method of identifying and scanning data sources, such as data sources 106-109 of FIG. 1, for information regarding a target individual, and providing alerts to a monitoring entity in response to identification of information that matches rules.

Beginning in block 210, the identity scanner 100 receives information regarding the target individual ("target"). In some embodiments, multiple targets may be identified by a monitoring entity. For example, a parent of four children may provide information regarding each of the four children so that each child is a target of the identity scanner 100, and the parent receives alerts regarding each of the four children. However, for ease of discussion, the methods and systems discussed herein are refer to only a single target. All systems and methods should also be interpreted as covering monitoring of multiple targets at the request of a single monitoring entity. As noted above, the target identifiers may include various types of identification information, such as name, address, social networks frequented by the target, blogs operated by and/or visited by the target, nicknames, login names, credential information for sites having private information regarding the target, and/or any other information that is useful in allowing the identity scanner 102 to identify and analyze information regarding the target.

Next, in block 220, the identity scanner scans the network sites for information regarding the target. In the embodiment of FIG. 1, the identity scanner 100 includes a discovery module that identifies data sources to be monitored for activity related to the target, and an extraction module that extracts data regarding the target. In other embodiments, these modules may be combined or further separated. Thus, various hardware and software configurations may be used to identify data sources to be scanned and/or scan those data sources for information regarding the target. As noted above, the information regarding the target may include publicly available information (e.g., information posted on a publicly accessible blog) or privately held information (e.g., information on a social networking site that is only accessible to the target or a group of friends to the target). Depending on the embodiment, the identity scanner 100 may retrieve the information by scraping websites or other data structures provided by the network sources, or may use APIs, or other interface protocols, to access data structures that are not necessarily displayed in user interfaces.

In one embodiment, the information regarding the target includes not only raw data from the data sources, but also includes derivative data that is generated based on the raw data. For example, image processing software may be used to process image data from the data sources in order to identify one or more of various objects of interest to monitoring entities. For example, the image processing software may include a list of hundreds, thousands, or more objects each having respective criteria for locating the objects in image data. As noted above, negative or positive factors, which may be associated with various information, may be used to generate risk scores for reporting to the monitoring entity. In one embodiment, the analysis module 170 accesses rules (e.g., system default and/or custom rules from the monitoring entity) for identifying positive of negative behaviors or events to report to the monitoring entity, such as based on types and/or quantity of positive and negative factors identified in the information.

In one embodiment, factors may be identified based on objects being identified in a photo, or possibly a series of photos having a defined relationship. For example, a negative factor (possibly having a high weighting) may be identified in response to location of a photograph including the target (using image processing software or based on text describing content of the photo) and two or more alcoholic beverages (e.g., using image processing software to identify likely alcoholic beverages in the image data). Thus, the negative factor may be stored with an association to the images that triggered the risk factor, and may be the basis of one or more alerts that are transmitted to the monitoring entity. In a similar manner, language processing software may be used to process text data from the data sources in order to identify one or more of various keywords or phrases of interest to monitoring entities. For example, the text processing software may include a list of keywords of interest, as well as various combinations of words and/or patterns of words (e.g., using regular expressions or any matching logic). The keywords, or combinations of keywords or patterns, may be linked individually, or as groups, to positive or negative factors. For example, a combination of three words (possibly within a defined proximity to one another) from a list of 20 words related to alcohol use may trigger a negative factor for the target. The negative factor me then be used as the basis for matching an alert rule (see discussion of block 230 below) and/or may be used in calculating one or more risk scores for the target.

In block 230, the identity scanner determines whether factors associated with the target, and possibly other information regarding the target, match one or more alert rules. Alert rules may be established by the monitoring entity and/or may be based on the default monitoring rules established by the provider of the identity scanner functionality. Alert rules may indicate multiple types of alerts, mediums of delivery of alerts, and criteria for sending such alerts. In one embodiment, the monitoring entity may indicate that negative factors are reported to the monitoring entity in a real-time manner, such as via SMS messages to a mobile device of the monitoring entity. Similarly, the monitoring entity may only want alerts in a realtime manner if a certain combination of factors are identified with a certain time frame and/or factors with a certain weighting. For example, alert rules may indicate that alerts are transmitted in response to a risk factor sum of a predetermined amount within a predetermined time period. For example, a real-time alert may be transmitted if negative factor sum exceeds 20 within any 60 minute time period. Depending on the embodiment, the negative factor sum may be offset by positive factors within the same time period, and certain factors may be weighted such that they add less than one or more than one to the negative factor sum.

If one or more alert rules are matched in block 230, the method continues to block 240 where an alert is transmitted to the monitoring entity (or other entity identified by the monitoring entity, such as a law enforcement agency). The alert may be transmitted according to default rules or based on preferences of the monitoring entity. For example, the identity scanner 100 may have default rules to transmit alerts reporting factors of a first type (e.g., those categorized as high risk or having a certain weighting) by SMS, while sending alerts reporting factors of a second type (e.g., those categorized as low risk or having a certain weighting) in weekly e-mail digest and on a web portal. In one embodiment, the monitoring entity can customize the delivery mediums for various alerts.

Figure 3:
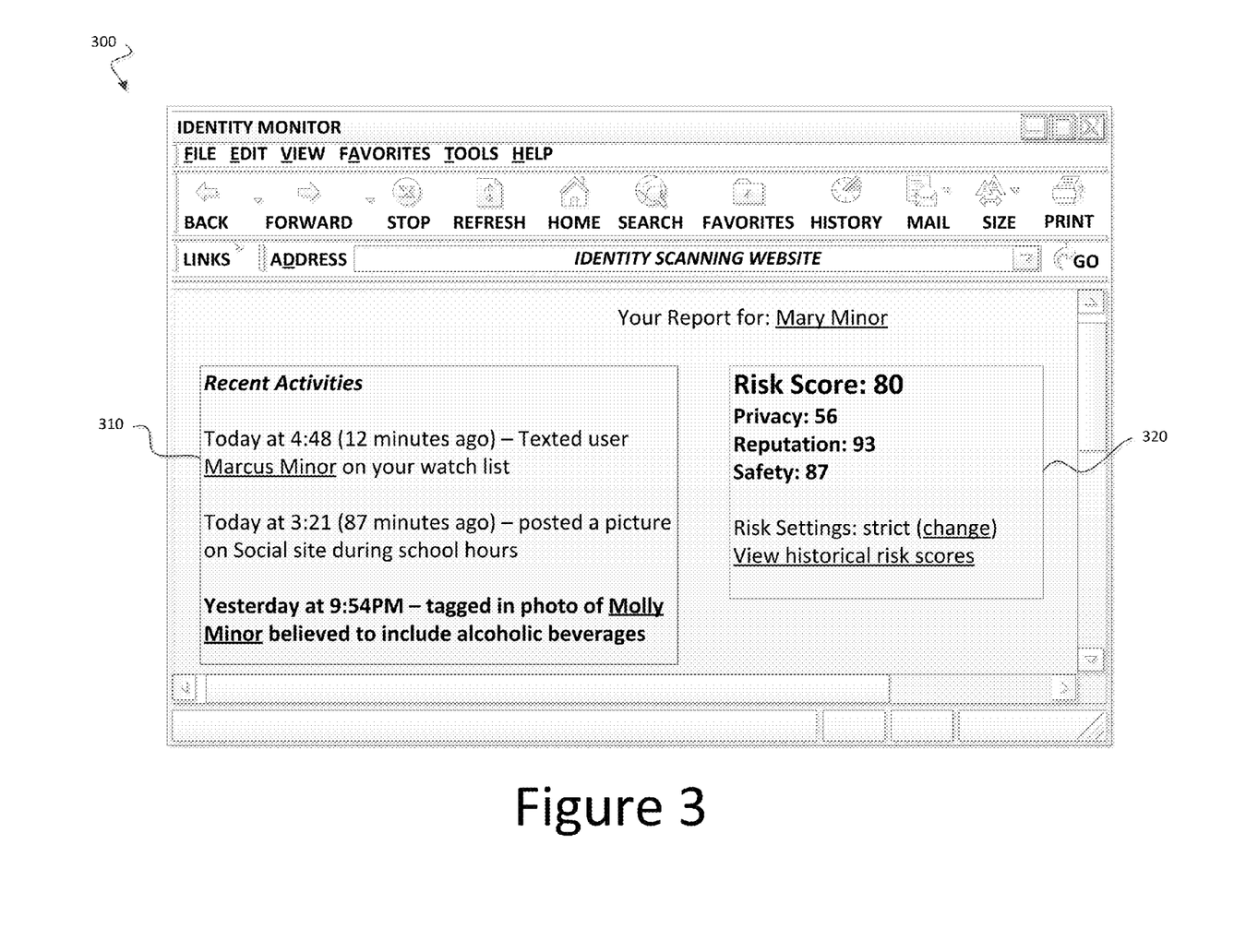
FIG. 3 is a sample user interface that provides information regarding a target's activities online.

FIG. 3 is a sample user interface that displays information regarding a target. The sample user interface 300 may be available to the monitoring entity after logging into a network accessible portal, for example. The user interface may be made available to the monitoring entity and any other available manner, such as in a standalone application on a computer or mobile phone. The information illustrated in FIG. 3 is exemplary. In other embodiments, additional information, less information, other types of information, information formatted in different manners, etc. may be provided in similar user interfaces.

In the example user interface of FIG. 3, recent activities of the target are displayed in a window 310, in this example data regarding Mary Minor. The first alert indicates that Mary Minor texted a user on a "no-contact" list of individuals provided by the monitoring entity. For example, the monitoring entity may establish a list of individuals that, when contacted by the target in any manner (e.g., text messages, phone calls, online chat, etc.) triggers a factor that matches an immediate alert rule. The alert rules may include frequency criteria for contacts with the indicated individuals, temporal criteria, criteria requiring contact with two or more individuals, or any other combination of criteria that must be met before an alert is transmitted. While factors may not trigger an immediate alert, the factors may still be included in information provided to the monitoring entity (e.g., the user interface of FIG. 3) and/or used in calculating one or more risk scores.

In the embodiment of FIG. 3, the recent activities window 310 provides a real-time "ticker" of factors identified for the target. In this example, high risk factors are highlighted, such as by bolded text, as used in the last factor shown in the recent activities window 310. As discussed above, the high risk factor may be provided to the monitoring entity in one or more other mediums, such as by a SMS or automated phone call.

The sample user interface of FIG. 3 also includes a score window 320 that provides various risk scores for the target. In this embodiment an overall Risk Score of 80 has been assigned to the target, and category particular risk scores of 56 for privacy, 93 for reputation, and 87 for safety are also displayed. These category risk scores provide the monitoring entity with information on risk levels for particular attributes of the target's identity. In one embodiment, "privacy" indicates how private a target's profile on one or more social media sites is and how many friends can see the target's updates, "reputation" indicates the extent to which the target is doing things to help or harm their reputation, and "safety" indicates the extent to which the targets safety is at risk. In other embodiments, fewer or additional category risk scores may be provided. For example, a health risk score may be provided.

The score window 320 also includes an indication of a risk setting for the target, in this case "strict." In one embodiment, the identity scanner includes one or more pre-set (and/or user-customizable) scrutiny levels (e.g., strict, moderate, lenient, etc.) that may be selected by the monitoring entity in order to calibrate the identity scanner to the particular needs of the monitoring entity. For example, a "strict" scrutiny level may be selected for a young teenager with very conservative parents, while a "moderate" or "lenient" scrutiny level may be selected for older teenagers, possibly with less conservative parents. The scrutiny levels may affect criteria for identifying factors, alert criteria for determining when and how to transmit alerts, and how one or more risk scores are calculated. For example, Mary Minor may have a risk score of less than 80 if the risk settings are changed from strict to moderate or lenient.

In one embodiment, each of the risk scores includes a link that provides additional information regarding calculation of the respective risk score selected. For example, if the safety risk score is selected, a new user interface (e.g., a pop-up window or a separate window) may be provided, which indicates factors that contributed to the calculated risk score and possibly the underlying data (e.g., text, calls, messages, photos, posts, etc.) that caused the factor to be recorded.

In the embodiment of FIG. 3, the user interface includes an option to view historical risk scores, such as in a chart, graph, or other format. The historical risk scores may be provided in a separate user interface, a pop-up window, or in any other format. The historical risk scores may include one or more category risk scores, as well as the overall risk or.

Figure 4:
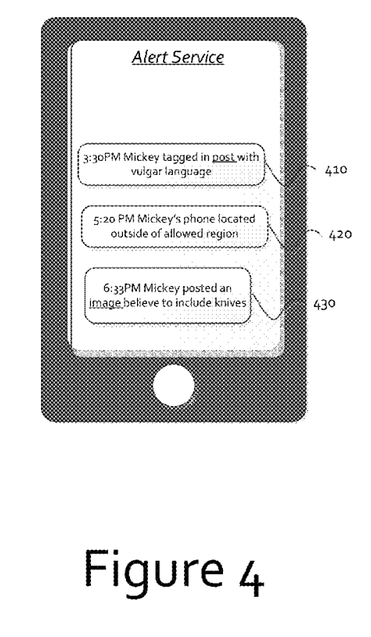
FIG. 4 is a sample mobile interface that provides a real-time stream of events and/or alerts regarding a target individual.

FIG. 4 illustrates an exemplary mobile device with alert messages received from the identity scanner 100 displayed. In the embodiment of FIG. 4, the alerts are in the form of text messages that are delivered in realtime (or substantially realtime) after an alert rule is matched. For example, the alert 410 may have been sent in response to triggering of a negative factor detected by posting of a photo in which Mickey is tagged. The negative factor may alone be enough to trigger an alert rule. In other embodiments, the alert rules may include other requirements, such as presence of alcohol or other substances in the photo. The alert 420 may have been sent in response to geo-location data from Mickey's cell phone indicating that she is outside of an allowed region defined by the monitoring entity (e.g., an area around Mickey's home and school). The alert 430 may have been sent in response to analysis of an image posted by Mickey that is believed to include a knife. In other embodiment, alerts 410, 420, 430 are transmitted in other manners and include less or additional information regarding the match rule and/or the associated factors.

SUMMARY

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by an Information Display Computing Device and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of providing information to a guardian of a minor regarding activities of the minor, the method comprising:

receiving information from the guardian identifying one or more events of interest to the guardian;

scanning a plurality of online data sources including at least one social network for information regarding the minor, wherein information regarding the minor includes information provided by the minor and information provided by one or more third-parties that refers to the minor;

determining one or more keywords or patterns of words to search for in the information regarding the minor, wherein presence of the keywords or patterns is indicative of one or more of the identified events;

parsing text portions of the information to identify text matching the one or more keywords or patterns indicative of one or more of the identified events;

scanning image portions of the information to identify objects present in the images matching one or more objects indicative of one or more of the identified events; and determining a risk score for the minor based on at least a quantity of identified text and identified objects.

2. The method of claim 1, further comprising:

identifying one or more negative factors associated with respective keywords or patterns identified in the text portions of the information or associated with respective identified objects;

identifying one or more positive factors associated with respective keywords or patterns identified in the text portions of the information or associated with respective identified objects;

wherein the risk score is based on at least the negative and positive factors.

3. The method of claim 1, further comprising:

identifying one or more negative factors associated with respective keywords or patterns identified in the text portions of the information or associated with respective identified objects; and determining weightings for respective factors, the weightings indicating importance of the respective negative factors;

wherein the risk score is dependent on weightings of the respective factors.

4. The method of claim 1, further comprising:

receiving login information regarding respective data sources that is usable to access non-public information regarding the minor from the respective data sources.

5. The method of claim 1, wherein the negative factors are associated with activities that the guardian likes the minor to participate in, and the positive factors are associated with activities that the guardian does not like the minor to participate in.

6. A method of providing real-time information regarding activities of an individual, the method comprising:

receiving, from a computing device of a monitoring entity, at least a name of a target individual for which information is desired;

periodically accessing or receiving information from one or more social media networks for information regarding the target individual, wherein the information regarding the target individual includes information provided by the target individual and information provided by one or more third-parties that refers to the target individual;

analyzing the information regarding the target individual to determine whether any of the information is indicative of a high risk activity; and in response to determining that one or more high risk activities are in the information, initiating transmission of a real-time alert to a computing device of the monitoring entity.

7. The method of claim 6, wherein the high risk activity is associated with an alert rule that defines criteria for detecting the high risk activity.

8. The method of claim 7, wherein the criteria include detection of one or more negative factors.

9. The method of claim 7, further comprising:

generating user interface information for transmission to the computing device of the monitoring entity, the user interface information identifying a plurality of activities of the target individual.

10. The method of claim 9, wherein the user interface information highlights ones of the plurality of activities that are categorized as high risk activities.

11. The method of claim 10, wherein high risk activities include activities that indicate possible illegal activities.

12. A system for monitoring online activity impacting a user comprising:

a memory configured to store computer program instructions;

a discovery engine configured to discover one or more social networks in which the user is involved or mentioned;

a data extraction engine configured to extract data from the one or more social networks discovered by the discovery engine;

an analytics engine configured to interpret the data extracted by the data extraction engine to identify information that may help or hurt the user's privacy, reputation or safety;

a scoring engine configured to determine a risk score for the user based on at least a number of occurrences of identified information; and a reporting engine configured to provide the identified information and the risk score.

* * * * *